US012676513B2

(12) United States Patent
Kanakasabai et al.

(10) Patent No.: US 12,676,513 B2
(45) Date of Patent: Jul. 7, 2026

(54) POWER TRANSFER DISABLEMENT SWITCH IN A WIRELESS POWER RECEPTION APPARATUS

(71) Applicant: GE Intellectual Property Licensing, LLC, Niskayuna, NY (US)

(72) Inventors: Viswanathan Kanakasabai, Bangalore (IN); Jayanti Ganesh, Bangalore (IN); Subbarao Tatikonda, Bangalore (IN)

(73) Assignee: GE Intellectual Property Licensing, LLC, Niskayuna, NY (US)

( * ) Notice: Subject to any disclaimer, the term of this patent is extended or adjusted under 35 U.S.C. 154(b) by 118 days.

(21) Appl. No.: 18/546,820

(22) PCT Filed: Feb. 14, 2022

(86) PCT No.: PCT/US2022/016343
§ 371 (c)(1),
(2) Date: Aug. 17, 2023

(87) PCT Pub. No.: WO2022/177861
PCT Pub. Date: Aug. 25, 2022

(65) Prior Publication Data
US 2024/0146123 A1 May 2, 2024

(30) Foreign Application Priority Data
Feb. 19, 2021 (IN) .............................. 202111007255

(51) Int. Cl.
H02J 50/80 (2016.01)
H02J 50/12 (2016.01)
H02J 50/70 (2016.01)

(52) U.S. Cl.
CPC .............. H02J 50/80 (2016.02); H02J 50/70 (2016.02); H02J 50/12 (2016.02)

(58) Field of Classification Search
CPC ............. H02J 50/80; H02J 50/70; H02J 50/12
(Continued)

(56) References Cited

U.S. PATENT DOCUMENTS 10,008,881 B2 6/2018 Lee et al.
10,673,275 B2 6/2020 Jha et al.
(Continued)

FOREIGN PATENT DOCUMENTS

CN      107813729 A      3/2018
JP      2013132170       7/2013
(Continued)

OTHER PUBLICATIONS

"PCT Application No. PCT/US2022/016343 International Search Report and Written Opinion", Aug. 25, 2022, 9 pages.
(Continued)

*Primary Examiner* — Michael R. Fin
(74) *Attorney, Agent, or Firm* — DeLizio, Peacock, Lewin & Guerra, LLP

(57) ABSTRACT

This disclosure provides systems, methods and apparatuses for preventing power transfer in a secondary coil of a wireless power reception apparatus. Some implementations relate generally to the use of one or more switches. In some implementations, the one or more switches may be coupled in series to one or both ends of the secondary coil. The one or more switches may be controlled based on a handshake communication between the wireless power reception apparatus and a compatible wireless power transmission apparatus. The one or more switches may be controlled using bias power from a wireless communication interface that is separate from a power reception circuitry that includes the secondary coil. The one or more switches may disable power transfer in the secondary coil to protect one or more components of the wireless power reception apparatus or to (Continued)

PRESENT ONLY WHEN THE INDUCTION COIL SUPPORTS WIRELESS POWER TRANSFER enable measurement of a coupling factor during measurement periods.

12 Claims, 6 Drawing Sheets

(58) Field of Classification Search
USPC ........................................................ 307/104
See application file for complete search history.

(56) References Cited

U.S. PATENT DOCUMENTS

| 10,700,550 | B2 | 6/2020 | Jha et al. | |
| 2009/0108805 | A1* | 4/2009 | Liu | H01F 38/14 |
| | | | | 320/108 |
| 2011/0278948 | A1* | 11/2011 | Forsell | A61N 1/3787 |
| | | | | 307/104 |
| 2013/0093388 | A1* | 4/2013 | Partovi | H01F 38/14 |
| | | | | 320/108 |
| 2014/0063666 | A1 | 3/2014 | Kallal et al. | |
| 2014/0152114 | A1 | 6/2014 | Kim et al. | |
| 2014/0346888 | A1* | 11/2014 | Kim | H04B 5/79 |
| | | | | 307/104 |
| 2015/0171933 | A1* | 6/2015 | Hamada | H04B 5/79 |
| | | | | 455/41.1 |
| 2015/0303824 | A1 | 10/2015 | Celani | |
| 2016/0336782 | A1* | 11/2016 | Vilhauer | H02J 50/12 |
| 2017/0063161 | A1* | 3/2017 | Sugiyama | H02J 50/80 |
| 2017/0222479 | A1* | 8/2017 | Jha | B60L 53/12 |
| 2018/0062442 | A1 | 3/2018 | Qiu et al. | |
| 2020/0080455 | A1 | 3/2020 | Cook | |
| 2020/0099256 | A1 | 3/2020 | Kanakasabai et al. | |
| 2021/0273465 | A1* | 9/2021 | Wan | H02J 7/007194 |

FOREIGN PATENT DOCUMENTS

| WO | 2010042054 | 4/2010 |
| WO | 2022177861 | 8/2022 |

OTHER PUBLICATIONS

"Korea application No. 10-2023-7031989 Request for Submission of Opinion", Feb. 21, 2025, 7 pages.
"Japan patent application No. 2023548804 First Office Action".
"IN Application No. 202111007255 First Examination Report"; Mar. 30, 2026; 7 pages.

* cited by examiner

PRESENT ONLY WHEN THE
INDUCTION COIL SUPPORTS
WIRELESS POWER TRANSFER

800

CONTROL ONE OR MORE SWITCHES POSITIONED BETWEEN A SECONDARY COIL AND A POWER RECEPTION CIRCUIT OF A WIRELESS POWER RECEPTION APPARATUS BASED, AT LEAST IN PART, ON A COMMUNICATION FROM A WIRELESS POWER TRANSMISSION APPARATUS, THE SECONDARY COIL CONFIGURED TO RECEIVE POWER FROM A WIRELESS POWER SIGNAL OF THE WIRELESS POWER TRANSMISSION APPARATUS, THE POWER RECEPTION CIRCUIT CONFIGURED TO UTILIZE THE RECEIVED POWER.

900

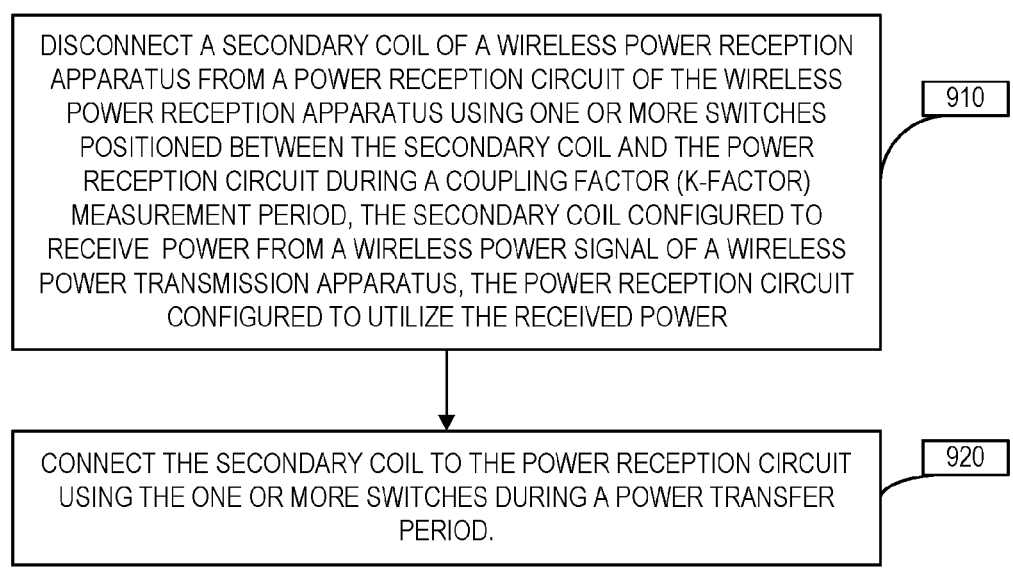

DISCONNECT A SECONDARY COIL OF A WIRELESS POWER RECEPTION APPARATUS FROM A POWER RECEPTION CIRCUIT OF THE WIRELESS POWER RECEPTION APPARATUS USING ONE OR MORE SWITCHES POSITIONED BETWEEN THE SECONDARY COIL AND THE POWER RECEPTION CIRCUIT DURING A COUPLING FACTOR (K-FACTOR) MEASUREMENT PERIOD, THE SECONDARY COIL CONFIGURED TO RECEIVE POWER FROM A WIRELESS POWER SIGNAL OF A WIRELESS POWER TRANSMISSION APPARATUS, THE POWER RECEPTION CIRCUIT CONFIGURED TO UTILIZE THE RECEIVED POWER

910

CONNECT THE SECONDARY COIL TO THE POWER RECEPTION CIRCUIT USING THE ONE OR MORE SWITCHES DURING A POWER TRANSFER PERIOD.

POWER TRANSFER DISABLEMENT SWITCH IN A WIRELESS POWER RECEPTION APPARATUS

CROSS-REFERENCE TO RELATED APPLICATIONS

This Patent Application is a National Stage of International Application No. PCT/US2022/016343, filed Feb. 14, 2022, and claims priority to India Provisional Patent Application No. 202111007255, filed Feb. 19, 2021, entitled "POWER TRANSFER DISABLEMENT SWITCH IN A WIRELESS POWER RECEPTION APPARATUS," and assigned to the assignee hereof, the disclosures of which are is incorporated by reference in this Patent Application.

TECHNICAL FIELD

This disclosure relates generally to wireless power. More specifically, this application relates to a power transfer disablement switch in a wireless power reception apparatus.

DESCRIPTION OF RELATED TECHNOLOGY

Technology has been developed to enable the wireless transmission of power from a wireless power transmission apparatus to a wireless power reception apparatus. Examples of a wireless power reception apparatus may include some types of mobile devices, small electronic devices, computers, tablets, gadgets, appliances (such as cordless blenders, kettles, or mixers), and some types of larger electronic devices, among other examples. Wireless power transmission may be referred to as a contactless power transmission or a non-contact power transmission. The wireless power may be transferred using inductive coupling or resonant coupling between a primary coil of the wireless power transmission apparatus and a secondary coil of the wireless power reception apparatus. For example, a wireless power transmission apparatus may include a primary coil that produces an electromagnetic field. The electromagnetic field may induce an electromotive force in a secondary coil of a wireless power reception apparatus when the secondary coil is placed in proximity to the primary coil. In this configuration, the electromagnetic field may wirelessly transfer power to the secondary coil.

In some traditional wireless power systems, a primary coil can transfer wireless energy to a secondary coil up to a rating predetermined by a wireless standard. For example, a low power wireless power signal may convey 5 Watts (5 W), 9 W, 12 W, or 15 W. A low power wireless power system may deliver up to 15 Watts of energy which is suitable for many electronic devices. Higher power wireless systems are being developed to support wireless power transmission to appliances or devices that require more power. For example, a high-power cordless kitchen transmitter may deliver power as high as 2.2 kW. Some induction systems may produce energy for purposes other than wireless power transfer (such as induction-based heating). There is a potential for unintentional power transfer to cause damage to electronics in a wireless power reception apparatus.

SUMMARY

The systems, methods, and apparatuses of this disclosure each have several innovative aspects, no single one of which is solely responsible for the desirable attributes disclosed herein.

One innovative aspect of the subject matter described in this disclosure can be implemented as a wireless power reception apparatus. The wireless power reception apparatus may include a secondary coil configured to receive power from a wireless power signal of a wireless power transmission apparatus. The wireless power reception apparatus may include a power reception circuit configured to utilize the received power. The wireless power reception apparatus may include one or more switches positioned between the secondary coil and the power reception circuit. The one or more switches may be configured to connect the secondary coil and the power reception circuit based on a communication from the wireless power transmission apparatus.

Another innovative aspect of the subject matter described in this disclosure can be implemented as a wireless power reception apparatus. The wireless power reception apparatus may include a secondary coil configured to receive power from a wireless power signal of a wireless power transmission apparatus. The wireless power reception apparatus may include a power reception circuit configured to utilize the received power. The wireless power reception apparatus may include one or more switches positioned between the secondary coil and the power reception circuit. The one or more switches configured to disconnect the secondary coil from the power reception circuit during a coupling factor (k-factor) measurement period and connect the secondary coil to the power reception circuit during a power transfer period.

Another innovative aspect of the subject matter described in this disclosure can be implemented as a method. The method may include controlling one or more switches positioned between a secondary coil and a power reception circuit of a wireless power reception apparatus based on a communication from a wireless power transmission apparatus. The secondary coil may be configured receive power from a wireless power signal of the wireless power transmission apparatus. The power reception circuit may be configured to utilize the received power.

Another innovative aspect of the subject matter described in this disclosure can be implemented as a method. The method may include disconnecting a secondary coil of a wireless power reception apparatus from a power reception circuit of the wireless power reception apparatus using one or more switches positioned between the secondary coil and the power reception circuit during a coupling factor (k-factor) measurement period. The secondary coil may be configured to receive power from a wireless power signal of a wireless power transmission apparatus. The power reception circuit may be configured to utilize the received power. The method may include connecting the secondary coil to the power reception circuit using the one or more switches during a power transfer period.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

FIG. 8 shows a flowchart diagram of an example process in accordance with some implementations.

FIG. 9 shows a flowchart diagram of another example process in accordance with some implementations.

Like reference numbers and designations in the various drawings indicate like elements.

DETAILED DESCRIPTION

Figure 1:
FIG. 1 shows a block diagram of an example wireless power transfer system.

A wireless power transfer (WPT) system may include a wireless power transmission apparatus and a wireless power reception apparatus. The wireless power transmission apparatus may include one or more primary coils that transmit wireless energy (as a wireless power signal) to one or more corresponding secondary coils in the wireless power reception apparatus. A primary coil refers to a source of wireless energy (such as inductive or magnetic resonant energy producing an electromagnetic field) in the wireless power transmission apparatus. A secondary coil located in the wireless power reception apparatus may receive the wireless energy via the electromagnetic field.

Some types of wireless power reception apparatuses (such as a cordless kitchen appliance, among other examples) may be intended to operate on a wireless power transmitting surface configured with one or more primary coils. As an example, a kitchen countertop or stovetop (sometimes referred to as a cooktop or a hob) may include one or more induction coils. An induction coil may be operated as a burner for heating a kitchen gadget or may be operated as a primary coil for wireless power transfer to a cordless kitchen appliance. Some induction hobs may implement different capabilities or combination of capabilities for different induction coils. For example, a subset of the induction coils for heating only and another subset of induction coils may be capable of heating or wireless power transfer. A conventional induction hob may support induction heating but may not support wireless power transfer. An unintentional placement of a cordless kitchen appliance meant for wireless power on the surface of a conventional induction hob can result in unintentional power transfer to the cordless kitchen appliance. This can create a dangerous safety concern and possibly damage the conventional induction hob or the cordless kitchen appliance, among other concerns. Furthermore, as the power generated by the induction coils reaches higher levels (compared to traditional wireless charging), the high power may damage electrical components of the cordless kitchen appliance. Additionally, or alternatively, there may be times during which induction of wireless power in a secondary coil is undesirable.

This disclosure provides systems, methods, and apparatuses for preventing power transfer in a secondary coil of wireless power reception apparatus. Some implementations relate generally to the use of one or more switches coupled to a secondary coil to prevent power transfer to the secondary coil when placed on a conventional induction hob that does not support wireless power transfer. In some implementations, the one or more switches may be coupled in series to one or both ends of the secondary coil. The one or more switches may be controlled based on communication (such as a handshake communication, sometimes referred to as a digital handshake) between the wireless power reception apparatus and a compatible wireless power transmission apparatus. A conventional induction hob does not have a communication system, while a wireless power transmission apparatus may require a handshake communication in accordance with a wireless power protocol. Therefore, the techniques of this disclosure prevent a wireless power reception apparatus from being inadvertently powered by a conventional induction hob.

In some implementations, the one or more switches may be normally open such that the secondary coil is disconnected from a power reception circuit. The power reception circuit may include a load, a rectifier, or both. After establishing a one-to-one communication with the wireless power transmission apparatus, the one or more switches may be closed to enable power transfer through the secondary coil. In some implementations, the one or more switches may be closed using bias power from a wireless communication interface. The wireless communication interface may be separate from a power reception circuitry that includes the secondary coil. In some implementations, the one or more switches may be kept open (to disable power transfer from the secondary coil) during measurement periods for determining a coupling of the secondary coil and the primary coil.

In some implementations, the one or more switches may be a first series switch connected to one side or leg of the secondary coil. Alternatively, or additionally, the one or more switches may include a second series switch connected to the other side or leg of the secondary coil. In some implementations, the one or more switches may include a static or electro-magnetic relay or other kind of switch that can block voltage when the switch is open. The one or more switches may be capable of conducting electricity in both positive and negative polarities such that an alternating current (AC) power can be induced in the secondary coil when the switch is closed. In some implementations, the one or more switches may include a shunt switch that shorts the two sides or legs of the secondary coil to protect one or more other components or during a measurement period.

In some implementations, a wireless communication interface (such as a short range radio frequency interface using Bluetooth™ or Near Field Communication (NFC), among other examples) may harvest a bias power via a communication signal. The bias power be used by the wireless power reception apparatus to control the one or more switches connected to the secondary coil. Thus, the one or more switches may be operated independently of a wireless power signal that would otherwise be received via the secondary coil.

In some implementations, the one or more switches may be referred to as a protective switch. The protective switch may be positioned between the secondary coil and one or more other components of the wireless power reception apparatus. For example, in some implementations, the protective switch may be positioned between the secondary coil and a rectifier of the wireless power reception apparatus. In some implementations, the protective switch may be positioned between the secondary coil and a load associated with the wireless power reception apparatus. The protective switch may remain open (thus disabling power transfer from the secondary coil) when the wireless power reception apparatus is placed on an incompatible induction coil (such as those that do not support wireless power transfer but are rather used for induction-based heating).

In some implementations, the one or more switches may enable a coupling factor measurement. A coupling factor (sometimes referred to as a k-factor) may be an indication of how well a secondary coil and a primary coil are capable of transferring wireless power. For example, the k-factor may be a measure of a potential flux linkage of wireless power transfer between the primary coil and the secondary coil. In some implementations, the k-factor may depend on, among other things, the quantity of turns (n1) in a primary coil, the quantity of turns (n2) in a secondary coil, a voltage (v1) transmitted by the primary coil, and a voltage (v2) induced in the secondary coil during a measurement period. In some implementations, it is desirable to disconnect the secondary coil from other components of the wireless power reception apparatus during a measurement period for determining the k-factor. Thus, in some implementations, the one or more switches described in this disclosure may enable a secondary coil to be disconnected from one or more other components (such as a rectifier, a load, or both) during a k-factor measurement period.

Particular implementations of the subject matter described in this disclosure can be implemented to realize one or more of the following potential advantages. The one or more switches may protect components of a wireless power reception apparatus when the wireless power reception apparatus is placed on an incompatible induction coil. For example, the one or more switches may improve safety of a cordless kitchen appliance that could be inadvertently placed on an induction coil that is not configured for wireless power transfer. Additionally, or alternatively, the one or more switches may improve the accuracy of k-factor measurement by disconnecting the secondary coil from one or more other components during a k-factor measurement period.

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system, or method for wireless power transfer.

FIG. 1 shows a block diagram of an example wireless power transfer system 100. The wireless power transfer system may include a wireless power transmission apparatus 102 and a wireless power reception apparatus 118. The wireless power transmission apparatus includes a primary coil 110. The primary coil 110 may be associated with a power signal generator 106. The primary coil 110 may be a wire coil which transmits wireless power (which also may be referred to as wireless energy). The primary coil 110 may transmit wireless energy using inductive or magnetic resonant field. Together, the power signal generator and the primary coil may generate a primary magnetic field during wireless power transfer. The power signal generator 106 may include components (not shown) to provide power to the primary coil 110 causing the primary coil 110 to produce the wireless power signal 155. For example, the power signal generator 106 may include one or more switches, drivers, series capacitors, rectifiers or other components.

The wireless power transmission apparatus 102 also may include a transmission controller 108 that controls the components of the power signal generator 106. For example, the transmission controller 108 may determine an operating point (such as voltage or current) and control the power signal generator 106 according to the operating point.

In some implementations, the power signal generator 106, the transmission controller 108 and other components (not shown) may be collectively referred to as a power transmitter circuit. Some or all of the power transmitter circuit may be embodied as an integrated circuit (IC) that implements features of this disclosure for controlling and transmitting wireless power to one or more wireless power reception apparatuses. The transmission controller 108 may be implemented as a microcontroller, dedicated processor, integrated circuit, application specific integrated circuit (ASIC) or any other suitable electronic device.

A power source 112 may provide power to the power transmitter circuit in the wireless power transmission apparatus 102. The power source 112 may convert alternating current (AC) power to direct current (DC) power. For example, the power source 112 may include a converter that receives an AC power from an external power supply (such as a supply mains) and converts the AC power to a DC power used by the power signal generator 106.

In some implementations, a first communication unit 142 may be coupled to the components of the power signal generator 106 or the primary coil 110 to send or receive communications via the wireless power signal 155. The first communication unit 142 may include logic for controlling one or more switches and other components that cause transmission and reception of communication signals via the wireless power signal 155. For example, the first communication unit 142 may include modulators or demodulators that convert information to modulated signals added to the wireless power signal 155. In one example, the first communication unit 142 may convert data from the transmission controller 108 into a frequency shift key (FSK) modulated signal that is combined with the wireless power signal 155 for a communication from the wireless power transmission apparatus 102 to the wireless power reception apparatus 118. In another example, the first communication unit 142 may sense load modulated amplitude shift key (ASK) signals from the power signal generator 106 or the primary coil 110 and demodulate the ASK signals to obtain data that the first communication unit 142 provides to the transmission controller 108. The communication signal that are transmitted or received via the wireless power signal 155 may be referred to as in-band communication because they are conveyed using the wireless power signal 155. By contrast, out-of-band communication may be conveyed as a wireless communication signal 175 using different wireless or wired communication channel separate from the wireless power signal 155. For example, the wireless communication signal 175 may include out-of-band communication via short range radio frequency communication (such as Bluetooth™) or Near-Field Communication (NFC).

The wireless power transmission apparatus 102 may include a wireless communication interface 114 configured to communicate with the wireless power reception apparatus 118 using a wireless communication signal 175. The wireless communication interface 114 may be connected to a first communication coil 116 (which may be a coil or a loop antenna, among other examples). The wireless communication interface 114 may include logic for controlling one or more switches and other components that cause transmission and reception of wireless communication signals via the first communication coil 116. In some implementations, the wireless communication interface 114 may support short range radio frequency communication or NFC. NFC is a technology by which data transfer occurs on a carrier frequency of 13.56 MHz. The wireless communication interface 114 also may support any suitable communication protocol.

The transmission controller 108 may detect the presence or proximity of a wireless power reception apparatus 118. In some implementations, the presence or proximity of the wireless power reception apparatus 118 may be detected based on a load change in response to a periodic low power signal generated by the power signal generator 106 and the primary coil 110. In some implementations, the presence or proximity of the wireless power reception apparatus 118 may happen during a periodic pinging process of the wireless communication interface 114 in the wireless power transmission apparatus 102. Alternatively, or additionally, the wireless power transmission apparatus 102 may detect the presence or proximity of the wireless power reception apparatus 118 based on a communication via the wireless communication signal 175. For example, the wireless power transmission apparatus 102 may periodically or continually transmit a communication or polling signal via the wireless communication signal 175. In some implementations, the wireless communication signal 175 may include a small amount of power (which may be referred to as a communication bias power or bias power) to power a wireless communication interface 132 of the wireless power reception apparatus 118. Upon receiving a response from the wireless power reception apparatus 118 via the wireless communication signal 175, the wireless power transmission apparatus 102 may perform further communication to confirm the compatibility and power requirement of the wireless power reception apparatus 118.

The transmission controller 108 may control characteristics of wireless power that the wireless power transmission apparatus 102 provides to the wireless power reception apparatus 118. After detecting the wireless power reception apparatus 118, the transmission controller 108 may receive information from a wireless power reception apparatus 118 (either via the wireless communication interface 114 or the first communication unit 142). For example, the transmission controller 108 may receive the information as part of a handshake communication with the wireless power reception apparatus 118. A handshake communication (sometimes referred to as a digital handshake) refers to a one-to-one communication between the wireless power reception apparatus 118 and the wireless power transmission apparatus 102. During the handshake communication, the wireless power transmission apparatus 102 may transmit a first communication signal and the wireless power reception apparatus 118 may respond to the first communication signal by transmitting information (such as a power rating, the manufacturer, the model, or parameters of the receiver when operating on a standard transmitter, among other examples). For example, the transmission controller 108 and a receiver controller 128 may communicate information from each other via respective wireless communication interfaces. The transmission controller 108 may use the information it receives from the receiver controller 128 to determine at least one operating control parameter (such as frequency, duty cycle, voltage, etc.) for wireless power it provides to the wireless power reception apparatus 118. To configure the wireless power, the transmission controller 108 may modify the frequency, duty cycle, voltage or any other suitable characteristic of the power signal generator 106.

The wireless power reception apparatus 118 may include a secondary coil 120 and a receiver controller 128. In some implementations, the wireless power reception apparatus 118 may include a rectifier 126. The wireless power reception apparatus may include, or be connected to a load 130. In some implementations, the load 130 may be external to the wireless power reception apparatus 118 and coupled via electrical lines from the secondary coil 120 or the rectifier 126 (if present). The rectifier 126, the load 130, or both may be referred to as a power reception circuit. The power reception circuit may be configured to utilize the received power. The secondary coil 120 is configured to receive power (based on the induced voltage) via the wireless power signal 155. The secondary coil 120 may provide the received power to the power reception circuit. When the secondary coil 120 is aligned to the primary coil 110, the secondary coil 120 may generate an induced voltage based on a received wireless power signal from the primary coil 110. In some implementations, a capacitor (not shown) may be in series between the secondary coil 120 and the rectifier 126 (if present) or the load 130 (if a rectifier 126 is not present). When present, the rectifier 126 may rectify the induced voltage and provide the rectified voltage to the load 130.

A receiver controller 128 may control one or more components of wireless power reception apparatus 118. In some implementations, the receiver controller 128 may be connected to a second communication unit 152 for in-band communication via the wireless power signal. For example, the second communication unit 152 may be coupled to the components of the secondary coil 120 or the rectifier 126 to send or receive communications via the wireless power signal. The second communication unit 152 may include logic for controlling one or more switches (not shown) and other components that cause transmission and reception of communication signals via the wireless power signals.

The wireless power reception apparatus 118 may include a wireless communication interface 132. The wireless communication interface 132 may contain modulation and demodulation circuits to wirelessly communicate via a second communication coil 134 (which may be a coil or a loop antenna, among other examples). Thus, the receiver controller 128 may wirelessly communicate with the transmission controller 108 via the wireless communication interface 132 and the wireless communication signal 175. In some implementations, the wireless communication interface 132 may be configured to communicate using NFC or Bluetooth technology. In some implementations, the wireless communication interface 132 may be powered by harvesting energy from the wireless communication signal 85. For example, the wireless communication interface 132 may harvest energy from the wireless communication signal 175 via the second communication coil 134 in the form of bias power. The bias power may be enough to power the wireless communication interface 132 but less than amount needed to power the load 130. In some implementations, the bias power may be used by other components of the wireless power reception apparatus 118, such as the receiver controller 128. After the secondary coil 120 and the power reception circuit are connected, they may begin receiving wirelessly transferred power. In some implementation, once the wireless power reception apparatus 118 begins receiving the wirelessly transferred power, the bias power may be derived from the wirelessly transferred power.

As described herein, the wireless power signal 155 may be used to wirelessly transfer power using electromotive force in the secondary coil 120. The electromotive force may create an electrical voltage and current in the secondary coil 120 when the secondary coil 120 is connected to other components (such as the rectifier 126 or the load 130) in the wireless power reception apparatus 118. However, there may be times during which the wireless power reception apparatus 118 may not be ready to use the power or when the power could otherwise damage the other components of the wireless power reception apparatus 118. Furthermore, the secondary coil 120 may unexpectedly receive energy from an induction coil used for heating (rather than wireless power transfer). To prevent damage to the other components or to disable the transfer of unintended wireless power, a switch 150 may connected to one or both of the ends of the secondary coil 120. Thus, even if a magnetic field is induced near the secondary coil 120, the secondary coil 120 will not conduct a current due to the secondary coil 120 being disconnected from the power reception circuit. Thus, the switch 150 may prevent an induced voltage from flowing through the secondary coil 120 to the power reception circuit. This disclosure includes several options for placement, structure, and operation of the switch 150. For example, the switch 150 may be a switch connected in series between the secondary coil 120 and the rectifier 126 (or the load 130) as illustrated in FIG. 1. Other potential configurations of the switch 150 are described herein.

The switch 150 also may be used to disconnect the secondary coil 120 from the power reception circuit (such as the rectifier 126, the load 130, or both) during a k-factor measurement period. The k-factor measurement period may be different from a power transfer period. In some implementations, the k-factor measurement period may precede the power transfer period. Alternatively, or additionally, a plurality of k-factor measurement periods may interleave a plurality of power transfer periods in an alternating pattern. The power transfer period may include powering the load 130 using the power received by the secondary coil 120. By contrast, a k-factor measurement period may be used to measure a coupling factor between the secondary coil 120 and the primary coil 110. During a k-factor measurement period, the wireless power transmission apparatus 102 may transmit a k-factor measurement signal to the wireless power reception apparatus 118. The wireless power reception apparatus 118 may measure a voltage of the k-factor measurement signal during the k-factor measurement period. It may be desirable to disconnect the power reception circuit during the k-factor measurement period to prevent the power reception circuit from interfering with the k-factor measurement signal or to improve accuracy of the measurement. The receiver controller 128 may control the switch 150 to disconnect the rectifier 126 from the secondary coil 120 during the k-factor measurement period. The receiver controller 128 may send feedback to the wireless power transmission apparatus 102 (such as via the wireless communication interface 132) based on the measurements obtained during the k-factor measurement period.

Figure 2:
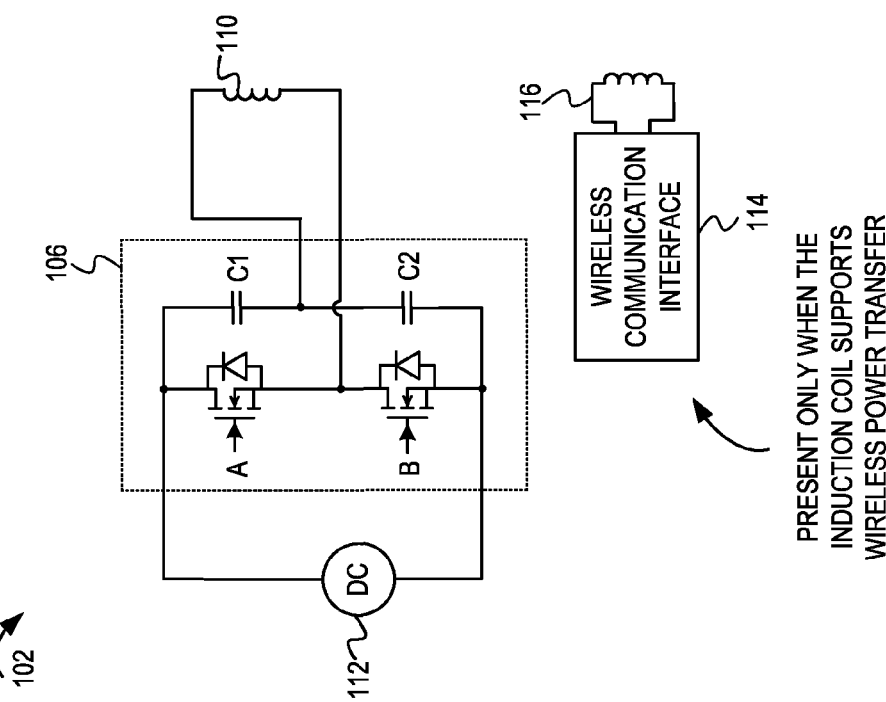
FIG. 2 shows a block diagram of an example wireless power transmission apparatus.

FIG. 2 shows a block diagram of an example wireless power transmission apparatus 102. The wireless power transmission apparatus 102 may include a power source 112, a power signal generator 106, and a primary coil 110. The power signal generator 106 is illustrated with a half-bridge circuit to convert a DC power from the power source 112 to an AC signal applied to the primary coil 110. Although not illustrated in FIG. 2, the power source 112 may include a conversion unit that converts an AC mains power to the DC power of the power source 112. Furthermore, the power signal generator 106 may be any type of power conversion circuit capable of providing an AC signal to the primary coil 110. For example, the power signal generator 106 may include the half-bridge circuit with parallel capacitors as shown in FIG. 2. Alternatively, the power signal generator 106 may include a full-bridge circuit.

The wireless power transmission apparatus 102 also may include the wireless communication interface 114 and the first communication coil 116 as described with reference to FIG. 1. The wireless communication interface 114 may be configured to send or receive communication signals via the first communication coil 116. The wireless communication interface 114 may implement a Bluetooth or NFC protocol or any other type of short range radio frequency communication protocol. The wireless communication interface 114 may be included in the wireless power transmission apparatus 102 because the wireless power transmission apparatus 102 is constructed according to a wireless power transfer (WPT) protocol.

As described herein, some induction-based systems that transfer energy may use induction for purposes other than wireless power transfer. For example, an induction-based heating element of a conventional induction hob may include a power source, power signal generator and induction coil that operate very similar to the power source 112, the power signal generator 106, and the primary coil 110, respectively. Because of the similarity, it is possible for those induction-based systems to inadvertently induce a voltage in a secondary coil of a wireless power reception apparatus. However, such conventional induction hobs that do not support the WPT protocol may not include the wireless communication interface 114 required by a technical standard for the WPT protocol. A wireless power reception apparatus may determine whether an induced voltage in its secondary coil is from a wireless power transmission apparatus 102 that supports the WPT protocol based on the presence of a handshake communication from the wireless communication interface 114. In the absence of the handshake communication, the wireless power reception apparatus may disconnect a secondary coil from a power reception circuit to prevent damage to the power reception circuit.

A traditional induction-based system (such as a conventional induction hob) may send a ping or a "pan detect" signal. When a pan or non-WPT device is placed on the hob, the hob may measure a change in impedance to detect that the pan or non-WPT device is located over the induction-based heating element. If the measured impedance falls within a tolerance limit, then the hob changes operation from ping mode to induction-based heating mode in which it transfers energy using induction. Hence, the pan detection is based on impedance offered by the pan/appliance. In the case of a wireless power reception apparatus (such as those described herein), the one or more switches may cause the impedance of the secondary coil to be outside the tolerance limit. For example, a series switch (as described with reference to FIGS. 1, 3, 4, 5, and 7) may cause the impedance measured by the traditional induction-based hob to be higher than the tolerance limit. A shunt switch (as described with reference to FIG. 6) may cause the impedance measured by the traditional induction-based hob to be below the tolerance limit. Thus, the traditional induction-based hob will not change to the induction-based heating mode.

Figure 3:
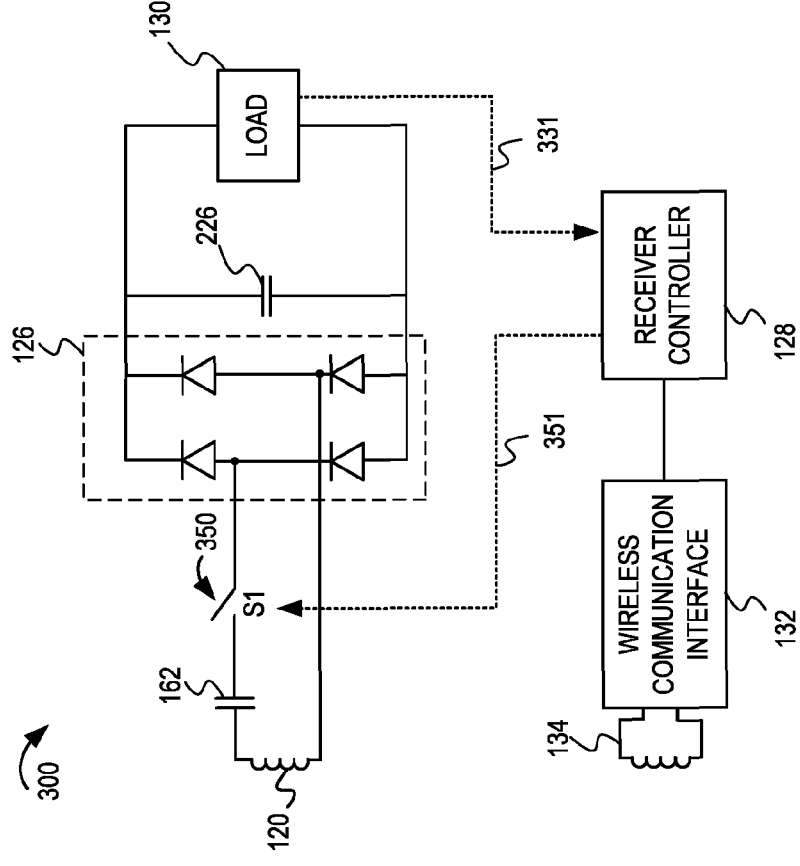
FIG. 3 shows a block diagram of an example wireless power reception apparatus with a switch connected in series between a secondary coil and a rectifier.

FIG. 3 shows a block diagram of an example wireless power reception apparatus 300 with a switch 350 connected in series between a secondary coil 120 and a rectifier 126. The components of the wireless power reception apparatus 300 may include components having like numbers as the wireless power reception apparatus 118 described with reference FIG. 1. The wireless power reception apparatus 300 may include a load 130 or the load 130 may be an external component connected to the wireless power reception apparatus 300. The example rectifier 126 illustrated in FIG. 3 is a full bridge rectifier configured to convert a received power from an AC signal to a DC power used by the load 130. In some implementations, the wireless power reception apparatus 300 may not include a rectifier 126. Other types of rectifiers or power conversion units may be used in various implementations. Furthermore, the wireless power reception apparatus 300 illustrates an optional capacitor 226 coupled between the two legs of the rectifier 126. In some implementations, the wireless power reception apparatus 300 may not include the optional capacitor 226. FIG. 3 also shows a capacitor 162 that may be coupled to one or more legs of the secondary coil 120. The switch 350 may be connected in series between one leg of the secondary coil 120 and the rectifier 126. The switch 350 may be connected before or after the capacitor 162 when the capacitor 162 is present on that leg.

The wireless power reception apparatus 300 includes a second communication coil 134, a wireless communication interface 132, and a receiver controller 128 as described with reference to FIG. 1. The wireless communication interface 132 may be configured to receive a communication signal from a wireless power transmission apparatus. For example, the wireless communication interface 132 may receive a communication signal from a corresponding wireless communication interface 114 as described with reference to FIGS. 1 and 2. The receiver controller 128 may sense status of the load 130 using a sense signal 331. The receiver controller 128 may control the switch 350 (labeled as "S1") using a control signal 351. In accordance with aspects of this disclosure, the receiver controller 128 may operate the control signal 351 based on the presence or absence of a handshake communication. For example, the receiver controller 128 may cause the switch 350 to connect the secondary coil 120 to the rectifier 126 (or the load 130) when the handshake communication has been established between the wireless power reception apparatus 300 and a wireless power transmission apparatus that implements the WPT protocol. Alternatively, or additionally, the receiver controller 128 may cause the switch 350 to disconnect the secondary coil 120 from the rectifier 126 (or the load 130) in the absence of the handshake communication or when wireless communication interface 132 receives a communication signal that is incompatible with the wireless power reception apparatus 300.

In some implementations, the second communication coil 134 may be configured to harvest energy from the communication signal to power the wireless communication interface 132 and the receiver controller 128. For example, the communication signal may provide enough energy to produce a bias power for startup and operation of the wireless communication interface 132 prior to a power transfer phase via the secondary coil 120. In some implementations, the bias power also may be used to operate the switch 350. In some implementations, the switch 350 may be normally open (NO) such that the secondary coil 120 is disconnected from the rectifier 126 until the switch 350 is closed. In some implementations, the switch 350 may be closed using the bias power obtained from the wireless communication interface 132 or from power from a battery (not shown) included in the wireless power reception apparatus 120.

In some implementations, the second communication coil 134 (such as an NFC coil) may potentially have an induced voltage from a traditional induction-based hob. However, the impedance caused by the second communication coil 134 may be outside a tolerance limit of the traditional induction-based hob. Furthermore, the second communication coil 134 typically has fewer turns or coils which limit the amount of induced voltage. Thus, the second communication coil 134 and the wireless communication interface 132 are less susceptible to over voltage or unintentional power transfer from a traditional induction-based hob.

Figure 4:
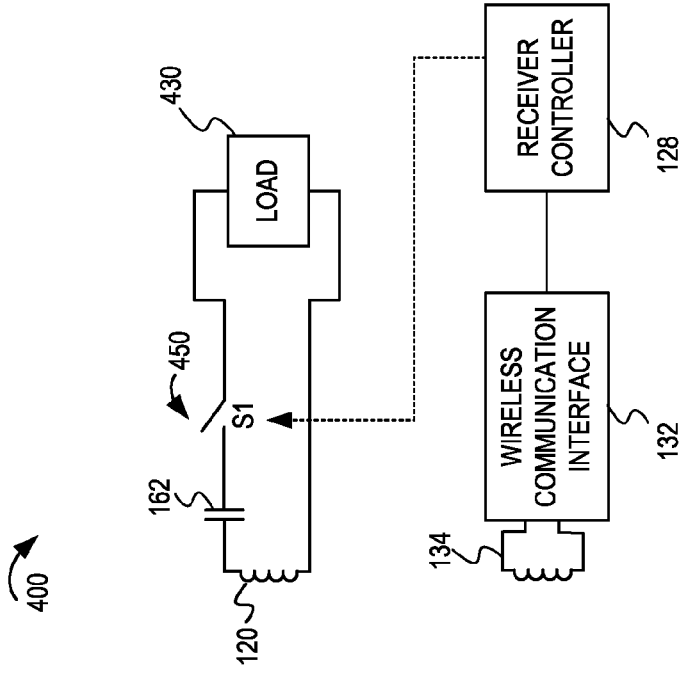
FIG. 4 shows a block diagram of an example wireless power reception apparatus with a switch connected in series between a secondary coil and a load.

FIG. 4 shows a block diagram of an example wireless power reception apparatus 400 with a switch 450 connected in series between a secondary coil 120 and a load 430. The components of the wireless power reception apparatus 400 may include components having like numbers as the wireless power reception apparatus 118 described with reference FIG. 1. However, the wireless power reception apparatus 400 may not include a rectifier (not shown) because the load 430 is configured to operate using an AC signal obtained by the secondary coil 120. In this example, the load 430 may be a power reception circuit configured to utilize the power obtained by the secondary coil 120. The switch 450 may be connected in series between the secondary coil 120 and the load 430 to prevent the load 430 from being damaged by an unexpected voltage induced in the secondary coil 120 such as when the wireless power reception apparatus 400 is placed near a non-WPT induction-based system. Similar to the wireless power reception apparatus 300 described with reference to FIG. 3, the receiver controller 128 may be configured to manage the switch 450 based on the absence or presence of a communication signal obtained by the wireless communication interface 132.

Figure 5:
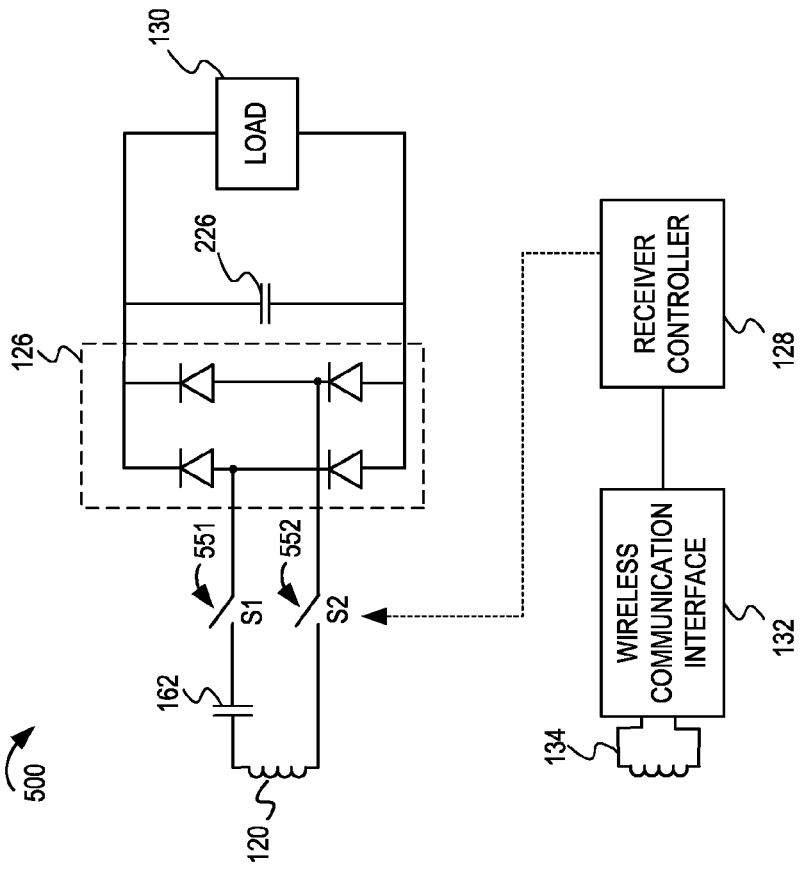
FIG. 5 shows a block diagram of an example wireless power reception apparatus with multiple switches connected in series between a secondary coil and a rectifier.

FIG. 5 shows a block diagram of an example wireless power reception apparatus 500 with multiple switches connected in series between a secondary coil 120 and a rectifier 126. The components of the wireless power reception apparatus 500 may include components having like numbers as the wireless power reception apparatus 300 described with reference FIG. 3. Instead of a single series switch (such as the switch 350 described with reference to FIG. 3), the wireless power reception apparatus 500 may include series switches 551 and 552 connected between the legs of the secondary coil 120 and the rectifier 126. A first series switch 551 (labeled as "S1") may be connected in series to a first leg of the secondary coil 120. A second series switch 552 (labeled as "S2) may be connected in series to a second leg of the secondary coil 120.

Figures 6, 7:
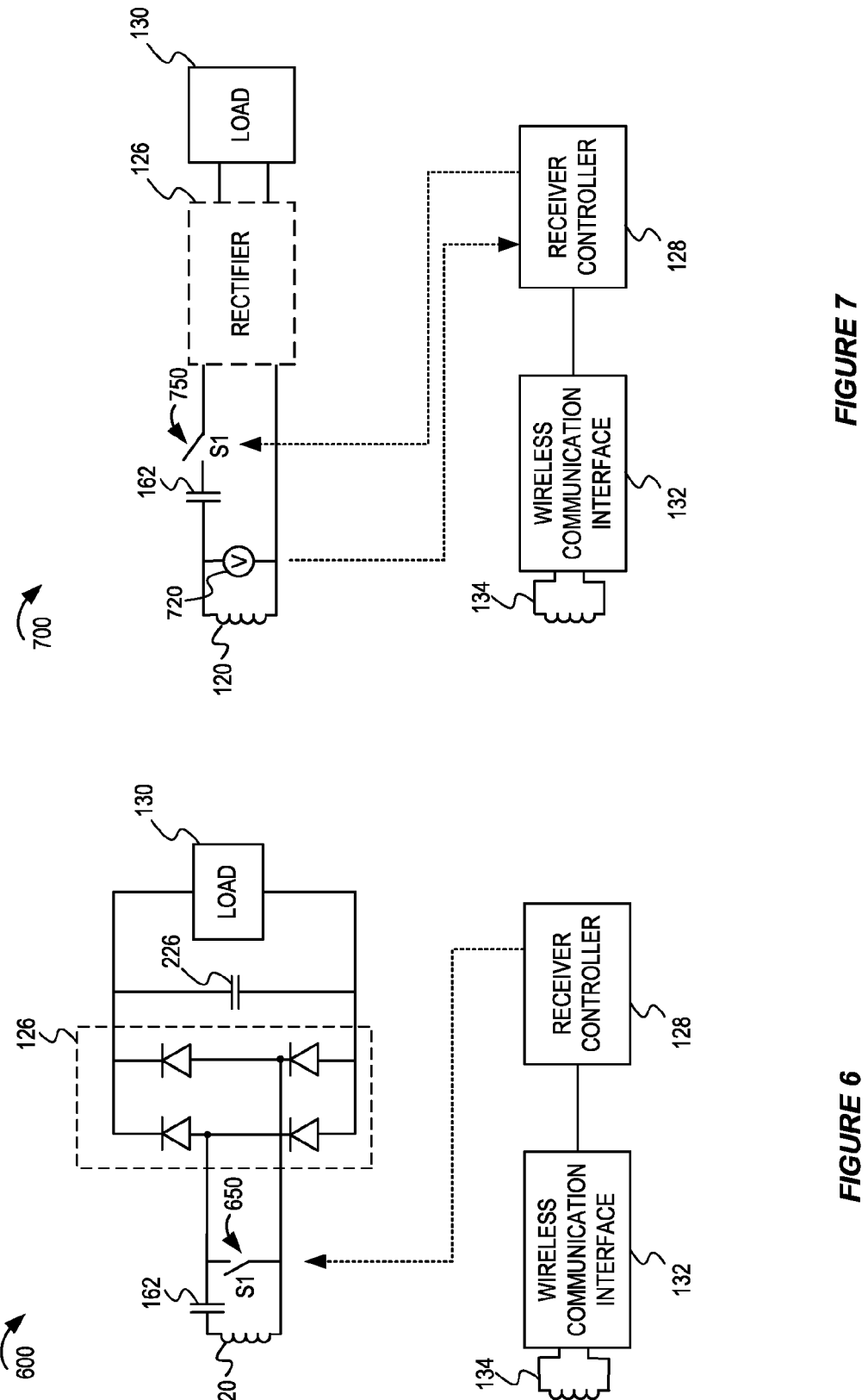
FIG. 6 shows a block diagram of an example wireless power reception apparatus with a switch connected as a shunt between two ends of a secondary coil.
FIG. 7 shows a block diagram of an example wireless power reception apparatus with a switch to enable disconnection of a secondary coil during a measurement period for determining a coupling factor.

FIG. 6 shows a block diagram of an example wireless power reception apparatus 600 with a switch 650 connected as a shunt between two ends of a secondary coil 120. The components of the wireless power reception apparatus 600 may include components having like numbers as the wireless power reception apparatus 118 described with reference FIG. 1. The switch 650 may be referred to as a shunt switch. The switch 650 may short circuit the ends of the secondary coil 120 to prevent or reduce an induced voltage in the secondary coil 120 from reaching the rectifier 126. In this example, the shunt switch 650 may be normally closed (to short-circuit the secondary coil 120) in the absence of a communication signal from a compatible wireless power transmission apparatus. When the wireless communication interface 132 receives a communication signal from a compatible wireless power transmission apparatus, the receiver controller 128 may open the switch 650 to permit the power to traverse from the secondary coil 120 to the rectifier 126.

FIG. 7 shows a block diagram of an example wireless power reception apparatus 700 with a switch 750 to enable disconnection of a secondary coil 120 during a measurement period for determining a coupling factor. The components of the wireless power reception apparatus 700 may include components having like numbers as the wireless power reception apparatus 118 and the wireless power reception apparatus 300 described with reference FIGS. 1 and 3, respectively. It should be noted that the switch 750 is illustrated as a series switch on one leg of the secondary coil 120. However, in some implementations, the switch 750 may be similar to any configuration of the switches 350, 450, 551, 552, or 650 as described with reference to FIG. 3, 4, 5, or 6, respectively.

The wireless power reception apparatus 700 also may include a voltage sensor 720 coupled to the secondary coil 120. During a k-factor measurement period, the receiver controller 128 may cause the switch 750 to disconnect the secondary coil 120 and the voltage sensor 720 from the power reception circuit (such as the rectifier 126 and the load 130). During a power transfer period (different from the k-factor measurement period), the receiver controller 128 may cause the switch 750 to connect the secondary coil 120 to the power reception circuit.

During the k-factor measurement period, a wireless power transmission apparatus (not shown) may transmit a k-factor measurement signal to the wireless power reception apparatus. The k-factor measurement signal may be a lower power than transmitted during a power transfer period. In some implementations, the k-factor measurement signal may be transmitted using a known or predetermined voltage (v1) and frequency (fp). The voltage sensor 720 may permit the receiver controller 128 to measure a received voltage (v2) of the secondary coil 120 during the k-factor measurement period. The receiver controller 128 may communicate feedback via the wireless communication interface 132 to the wireless power transmission apparatus. The feedback may be based on the v2 measured during the k-factor measurement period. The wireless power transmission apparatus may utilize the feedback to determine a coupling factor (k-factor). The k-factor may be used by the wireless power transmission apparatus to determine an operating point of a wireless power signal that the wireless power transmission apparatus transmits during the power transfer period. For example, the operating point may be based on a calculation that accounts for the ratio between the v1 and the v2.

In some implementations, a communication from the wireless power transmission apparatus to the wireless power reception apparatus may precede the k-factor measurement signal. For example, the wireless communication interface 132 may receive a communication from the wireless power transmission device to set up the k-factor measurement period before the k-factor measurement signal is received. In some implementations, the communication may indicate a start or duration of the k-factor measurement period. Alternatively, or additionally, the communication may include an instruction to begin the k-factor measurement period or may indicate that the wireless power transmission apparatus is sending the k-factor measurement signal. In some implementations, a communication (such as based on a WPT protocol) may infer that a k-factor measurement signal will be sent and may cause the wireless power reception apparatus to initiate the k-factor measurement period. Alternatively, or additionally, the communication may be an indication that the wireless power transmission apparatus supports a WPT protocol. The wireless power reception apparatus may determine the k-factor measurement period based on the WPT protocol.

FIG. 8 shows a flowchart diagram of an example process 800 in accordance with some implementations. The operations of the process 800 may be implemented by a wireless power reception apparatus as described herein. For example, the operations of process 800 may be implemented by any of the wireless power reception apparatuses 118, 300, 400, 500, 600, or 700 described with reference to FIG. 1, 2, 4, 5, 6, 6, or 7, respectively. For brevity, the operations are described as performed by an apparatus. At block 810, the apparatus may control one or more switches positioned between a secondary coil and a power reception circuit of a wireless power reception apparatus based, at least in part, on a communication from a wireless power transmission apparatus. The secondary coil may be configured to receive power from a wireless power signal of the wireless power transmission apparatus. The power reception circuit may be configured to utilize the received power.

FIG. 9 shows a flowchart diagram of another example process 900 in accordance with some implementations. The operations of the process 900 may be implemented by a wireless power reception apparatus as described herein. For example, the operations of process 900 may be implemented by any of the wireless power reception apparatuses 119, 300, 400, 500, 600, or 700 described with reference to FIG. 1, 2, 4, 5, 6, 6, or 7, respectively. For brevity, the operations are described as performed by an apparatus. At block 910, the apparatus may disconnect a secondary coil of a wireless power reception apparatus from a power reception circuit of the wireless power reception apparatus using one or more switches positioned between the secondary coil and the power reception circuit during a coupling factor (k-factor) measurement period. The secondary coil may be configured to receive power from a wireless power signal of the wireless power transmission apparatus. The power reception circuit may be configured to utilize the received power. At block 920, the apparatus may connect the secondary coil to the power reception circuit using the one or more switches during a power transfer period.

Figure 10:
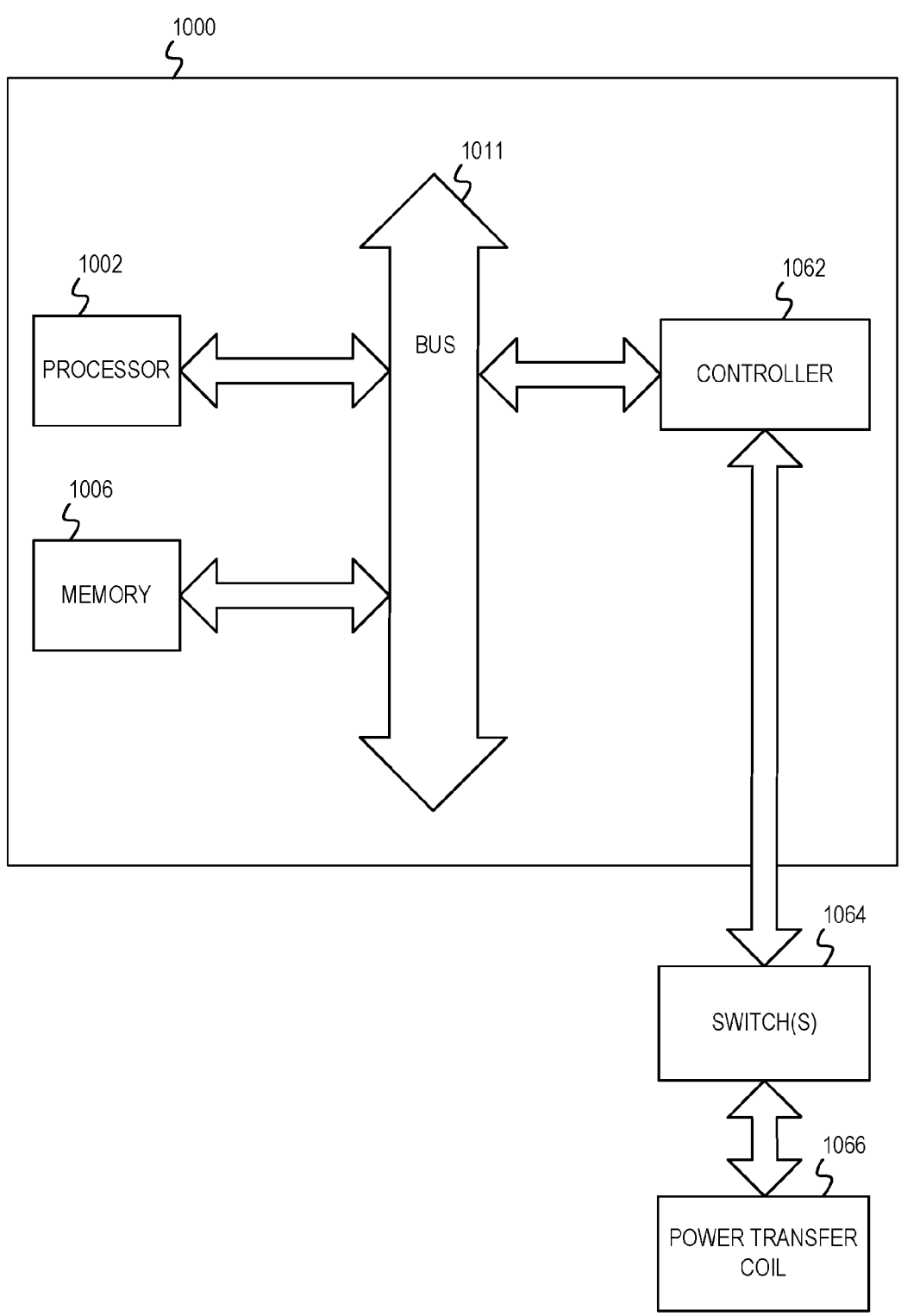
FIG. 10 shows a block diagram of an example apparatus for use in wireless power transfer system.

FIG. 10 shows a block diagram of an example apparatus 1000 for use in wireless power transfer system. In some implementations, the apparatus 1000 may be a wireless power reception apparatus, such as any of the wireless power reception apparatuses described herein. The apparatus 1000 can include a processor 1002 (possibly including multiple processors, multiple cores, multiple nodes, or implementing multi-threading, etc.). The apparatus 1000 also can include a memory 1006. The memory 1006 may be system memory or any one or more of the possible realizations of computer-readable media described herein. The apparatus 1000 also can include a bus 1011 (such as PCI, ISA, PCI-Express, HyperTransport®, InfiniBand®, NuBus®, AHB, AXI, etc.).

The apparatus 1000 may include one or more controller(s) 1062 configured to manage one or more switches 1064. The one or more switches 1064 may connect or disconnect a power transfer coil 1066 (such as a secondary coil) to a rectifier or load (not shown). In some implementations, the controller(s) 1062 can be distributed within the processor 1002, the memory 1006, and the bus 1011. The controller(s) 1062 may perform some or all of the operations described herein. For example, the controller(s) 1062 may implement the features of a driver controller described herein.

The memory 1006 can include computer instructions executable by the processor 1002 to implement the functionality of the implementations described with reference to FIGS. 1-9. Any one of these functionalities may be partially (or entirely) implemented in hardware or on the processor 1002. For example, the functionality may be implemented with an application specific integrated circuit, in logic implemented in the processor 1002, in a co-processor on a peripheral device or card, etc. Further, realizations may include fewer or additional components not illustrated in FIG. 10. The processor 1002, the memory 1006, and the controller(s) 1062 may be coupled to the bus 1011. Although illustrated as being coupled to the bus 1011, the memory 1006 may be coupled to the processor 1002.

FIGS. 1-10 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (identified as clauses for reference).

Clauses

Clause 1. A wireless power reception apparatus, including: a secondary coil configured to receive power from a wireless power signal of a wireless power transmission apparatus; a power reception circuit configured to utilize the received power; and one or more switches positioned between the secondary coil and the power reception circuit, the one or more switches configured to connect the secondary coil and the power reception circuit based, at least in part, on a communication from the wireless power transmission apparatus.

Clause 2. The wireless power reception apparatus of clause 1, where the power reception circuit includes a rectifier, and where the one or more switches includes a first switch connected in series between a first end of the secondary coil and the rectifier.

Clause 3. The wireless power reception apparatus of clause 2, where the one or more switches includes a second switch connected in series between a second end of the secondary coil and the rectifier.

Clause 4. The wireless power reception apparatus of clause 1, where the received power is an alternating current (AC) power, where the power reception circuit includes a load configured to utilize the AC power from the secondary coil, and where the one or more switches includes a switch connected in series between a first end of the secondary coil and the load.

Clause 5. The wireless power reception apparatus of clause 4, where the one or more switches includes a second switch connected in series between a second end of the secondary coil and the load.

Clause 6. The wireless power reception apparatus of any one of clauses 1-5, where the one or more switches are normally open to disconnect the secondary coil from the power reception circuit in an absence of the communication from the wireless power transmission apparatus.

Clause 7. The wireless power reception apparatus of any one of clauses 1-6, where the one or more switches are operated to connect the secondary coil and the power reception circuit when the communication from the wireless power transmission apparatus conforms to a wireless charging protocol.

Clause 8. The wireless power reception apparatus of any one of clauses 1-6, further including: a wireless communication interface configured to receive the communication from the wireless power transmission apparatus; and a receiver controller configured to control the one or more switches based, at least in part, on the communication.

Clause 9. The wireless power reception apparatus of clause 8, where the one or more switches are at least initially operated using a bias power obtained by a communication coil of the wireless communication interface.

Clause 10. The wireless power reception apparatus of clause 9, where the one or more switches are subsequently operated using the received power after the one or more switches connect the secondary coil and the power reception circuit.

Clause 11. The wireless power reception apparatus of any one of clauses 9-10, where the communication coil of the wireless communication interface is electrically separate from the secondary coil and the power reception circuit.

Clause 12. The wireless power reception apparatus of any one of clauses 8-11, where the wireless communication interface is a short-range radio frequency interface configured to receive and process a wireless communication signal from a corresponding wireless communication interface of the wireless power transmission apparatus.

Clause 13. The wireless power reception apparatus of any one of clauses 1-12, where the one or more switches include a protective switch configured to protect the power reception circuit from damage when the secondary coil is placed near an induction source that is not a wireless power transmission apparatus.

Clause 14. The wireless power reception apparatus of clause 1, where the one or more switches includes a shunt switch connected between two ends of the secondary coil, where the shunt switch is configured to prevent or reduce an induced voltage on the secondary coil from reaching the power reception circuit when the secondary coil is placed near an induction source that is not a wireless power transmission apparatus.

Clause 15. The wireless power reception apparatus of clause 14, where the shunt switch is normally closed to prevent or reduce the induced voltage from reaching the power reception circuit in an absence of the communication from the wireless power transmission apparatus.

Clause 16. A wireless power reception apparatus, including: a secondary coil configured to receive power from a wireless power signal of a wireless power transmission apparatus; a power reception circuit configured to utilize the received power; and one or more switches positioned between the secondary coil and the power reception circuit, the one or more switches configured to: disconnect the secondary coil from the power reception circuit during a coupling factor (k-factor) measurement period, and connect the secondary coil to the power reception circuit during a power transfer period.

Clause 17. The wireless power reception apparatus of clause 16, further including: a receiver controller configured to control the one or more switches based, at least in part, on the k-factor measurement period and the power transfer period.

Clause 18. The wireless power reception apparatus of clause 17, where the k-factor measurement period precedes the power transfer period, and where an operating point of the wireless power signal is based, at least in part, on a coupling factor determined during the k-factor measurement period.

Clause 19. The wireless power reception apparatus of any one of clauses 17-18, where the secondary coil is further configured to receive a k-factor measurement signal from a wireless power transmission apparatus, and where the k-factor measurement period enables measurement of a voltage of the secondary coil based on the k-factor measurement signal while the secondary coil is disconnected from the power reception circuit.

Clause 20. The wireless power reception apparatus of any one of clauses 16-19, further including: a wireless communication interface configured to receive a communication from the wireless power transmission device.

Clause 21. The wireless power reception apparatus of any one of clauses 16-20, where the communication includes at least one member of a group consisting of: an indication of a start or duration of the k-factor measurement period, an instruction to begin the k-factor measurement period, a communication that is inferred by the wireless power reception apparatus to initiate the k-factor measurement period, and an indication that the wireless power transmission apparatus supports a wireless power transfer protocol that specifies the k-factor measurement period.

Clause 22. The wireless power reception apparatus of any one of clauses 16-19, where the one or more switches includes at least one member of a group consisting of: a switch connected in series between a first end of the secondary coil and the power reception circuit; a switch connected in series between a second end of the secondary coil and the power reception circuit; a switch connected in series between a at least one end of the secondary coil and a load configured to utilize an alternating current (AC) of the received power; and a shunt switch connected between two ends of the secondary coil.

Clause 23. A method, including: controlling one or more switches positioned between a secondary coil and a power reception circuit of a wireless power reception apparatus based, at least in part, on a communication from a wireless power transmission apparatus, the secondary coil configured receive power from a wireless power signal of the wireless power transmission apparatus, the power reception circuit configured to utilize the received power.

Clause 24. The method of clause 23, where controlling the one or more switches includes disconnecting the secondary coil from the power reception circuit in an absence of the communication from the wireless power transmission apparatus.

Clause 25. The method of any one of clauses 23-24, where controlling the one or more switches includes connecting the secondary coil and the power reception circuit when the communication from the wireless power transmission apparatus conforms to a wireless charging protocol.

Clause 26. The method of any one of clauses 23-25, further including receiving the communication from the wireless power transmission apparatus via a wireless communication interface of the wireless power reception apparatus.

Clause 27. The method of clause 26, further including: harvesting a bias power via a communication coil of the wireless communication interface; and controlling the one or more switches at least initially using the bias power.

Clause 28. The method of clause 27, further including: subsequently controlling the one or more switches using the received power after the one or more switches connect the secondary coil and the power reception circuit.

Clause 29. The method of any one of clauses 26-28, where the wireless communication interface is a short range radio frequency interface configured to receive and process a wireless communication signal from a corresponding wireless communication interface of the wireless power transmission apparatus.

Clause 30. The method of any one of clauses 23-29, where controlling the one or more switches includes operating the one or more switches to protect the power reception circuit from damage when the secondary coil is placed near an induction source that is not a wireless power transmission apparatus.

Clause 31. A method, including: disconnecting a secondary coil of a wireless power reception apparatus from a power reception circuit of the wireless power reception apparatus using one or more switches positioned between the secondary coil and the power reception circuit during a coupling factor (k-factor) measurement period, the secondary coil configured to receive power from a wireless power signal of a wireless power transmission apparatus, the power reception circuit configured to utilize the received power; and connecting the secondary coil to the power reception circuit using the one or more switches during a power transfer period.

Clause 32. The method of clause 31, further including: controlling, by a receiver controller, the one or more switches based, at least in part, on the k-factor measurement period and the power transfer period.

Clause 33. The method of any one of clauses 31-32, further including: receiving, by the secondary coil, a k-factor measurement signal from a wireless power transmission apparatus during the k-factor measurement period; and measuring a voltage of the secondary coil based on the k-factor measurement signal while the secondary coil is disconnected from the power reception circuit during the k-factor measurement period.

Clause 34. The method of any one of clauses 31-33, further including: receiving, via a wireless communication interface, a communication from the wireless power transmission device.

Clause 35. The method of any one of clauses 31-34, where the communication includes at least one member of a group consisting of: an indication of a start or duration of the k-factor measurement period, an instruction to begin the k-factor measurement period, a communication that is inferred by the wireless power reception apparatus to initiate the k-factor measurement period, and an indication that the wireless power transmission apparatus supports a wireless power transfer protocol that specifies the k-factor measurement period.

Clause 36. The method of clause 33, further including: providing feedback to the wireless power transmission apparatus based on the voltage of the secondary coil that is measured during the k-factor measurement period.

The figures, operations, and components described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless power reception apparatus, comprising:
a secondary coil configured to receive wireless power from a wireless power signal of a wireless power transmission apparatus;
a power reception circuit configured to utilize the wireless power; and
one or more switches positioned between the secondary coil and the power reception circuit, the one or more switches configured to:
disconnect the secondary coil from the power reception circuit during a coupling factor (k-factor) measurement period, and
connect the secondary coil to the power reception circuit during a power transfer period.

2. The wireless power reception apparatus of claim 1, further comprising:
a receiver controller configured to control the one or more switches based, at least in part, on the k-factor measurement period and the power transfer period.

3. The wireless power reception apparatus of claim 2, wherein the k-factor measurement period precedes the power transfer period, and wherein an operating point of the wireless power signal is based, at least in part, on a coupling factor determined during the k-factor measurement period.

4. The wireless power reception apparatus of claim 2,
wherein the secondary coil is further configured to receive a k-factor measurement signal from the wireless power transmission apparatus, and
wherein the k-factor measurement period enables measurement of a voltage of the secondary coil based on the k-factor measurement signal while the secondary coil is disconnected from the power reception circuit.

5. The wireless power reception apparatus of claim 1, further comprising:
a wireless communication interface configured to receive a communication from the wireless power transmission apparatus, wherein the communication includes at least one member of a group consisting of:
an indication of a start or duration of the k-factor measurement period, an instruction to begin the k-factor measurement period, a communication that is inferred by the wireless power reception apparatus to initiate the k-factor measurement period, and an indication that the wireless power transmission apparatus supports a wireless power transfer protocol that specifies the k-factor measurement period.

6. A method of a wireless power reception apparatus, comprising:

operating a secondary coil and a power reception circuit of a wireless power reception apparatus, the secondary coil to receive wireless power from a wireless power transmission apparatus, the power reception circuit to utilize the received wireless power, wherein one or more switches are positioned between the secondary coil and the power reception circuit; and controlling the one or more switches, wherein controlling the one or more switches includes:

disconnecting the secondary coil from the power reception circuit using the one or more switches during a coupling factor (k-factor) measurement period; and connecting the secondary coil to the power reception circuit using the one or more switches during a power transfer period.

7. The method of claim 6, further comprising:

harvesting a bias power via a communication coil of a wireless communication interface of the wireless power reception apparatus;

controlling the one or more switches at least initially using the bias power; and subsequently controlling the one or more switches using the received wireless power after the one or more switches connect the secondary coil and the power reception circuit.

8. The method of claim 7, wherein the wireless communication interface is a short range radio frequency interface configured to receive and process a communication from a corresponding wireless communication interface of the wireless power transmission apparatus.

9. The method of claim 6, wherein controlling the one or more switches includes:

controlling the one or more switches based, at least in part, on the k-factor measurement period and the power transfer period.

10. The method of claim 6, further comprising:

receiving, by the secondary coil, a k-factor measurement signal from the wireless power transmission apparatus during the k-factor measurement period; and measuring a voltage of the secondary coil based on the k-factor measurement signal while the secondary coil is disconnected from the power reception circuit during the k-factor measurement period.

11. The method of claim 6, further comprising:

receiving, via a wireless communication interface, a control communication from the wireless power transmission apparatus, wherein the communication includes at least one member of a group consisting of:

an indication of a start or duration of the k-factor measurement period, an instruction to begin the k-factor measurement period, a communication that is inferred by the wireless power reception apparatus to initiate the k-factor measurement period, and an indication that the wireless power transmission apparatus supports a wireless power transfer protocol that specifies the k-factor measurement period.

12. The method of claim 10, further comprising:

providing feedback to the wireless power transmission apparatus based on the voltage of the secondary coil that is measured during the k-factor measurement period.

* * * * *